United States Patent [19]

Hoshikawa

[11] Patent Number: 4,597,636

[45] Date of Patent: Jul. 1, 1986

[54] LIQUID CRYSTAL DISPLAY PANEL AND A PROCESS FOR THE PRODUCTION THEREOF

[75] Inventor: Jun Hoshikawa, Shiojiri, Japan

[73] Assignee: Seiko Epson Corporation, Tokyo, Japan

[21] Appl. No.: 565,546

[22] Filed: Dec. 27, 1983

[30] Foreign Application Priority Data

Dec. 27, 1982 [JP] Japan ................ 57-228926

[51] Int. Cl.$^4$ ................................ G02F 1/13
[52] U.S. Cl. ................ 350/334; 350/331 R; 350/320
[58] Field of Search ............ 350/331 R, 334

[56] References Cited

U.S. PATENT DOCUMENTS

| 4,088,991 | 5/1978 | Sachar ................... 340/783 |
| 4,228,574 | 10/1980 | Culley et al. .......... 350/331 R X |
| 4,455,185 | 6/1984 | Sasaki et al. .......... 350/334 X |

FOREIGN PATENT DOCUMENTS

| 29125 | 10/1975 | Japan . |
| 72129 | 10/1975 | Japan . |
| 37951 | 10/1975 | Japan . |
| 112680 | 5/1976 | Japan . |
| 74199 | 1/1979 | Japan . |
| 54-126559 | 10/1979 | Japan ................ 350/331 R |
| 67480 | 11/1982 | Japan . |

*Primary Examiner*—John K. Corbin
*Assistant Examiner*—Richard F. Gallivan
*Attorney, Agent, or Firm*—Blum Kaplan Friedman Silberman & Beran

[57] ABSTRACT

A liquid crystal display panel assembly having a first plastic substrate with an electrode pattern thereon and at least two second plastic substrates each of a predetermined length, and also each bearing an electrode pattern. A sealant is provided for sealing a liquid crystal between the first and second substrates. Alignment apertures or peripheral recesses may be provided in both substrates for alignment thereof. The liquid crystal display panel assembly is made by forming an electrode pattern on at least one surface of the first plastic film substrate to define the first substrate. The second plastic film substrates are cut to a predetermined length from a second plastic film bearing an electrode pattern.

37 Claims, 4 Drawing Figures

LIQUID CRYSTAL DISPLAY PANEL AND A PROCESS FOR THE PRODUCTION THEREOF

BACKGROUND OF THE INVENTION

The present invention is generally directed to liquid crystal display panels and, in particular, to a liquid crystal display panel made of a pair of plastic substrates and a process for their production. Heretofore, misalignment of the substrates during assembly, due to the expansion or shrinkage of the plastics caused by heat or moisture, has been a problem. There is a need for providing a liquid crystal display panel using flexible plastic substrates which aligns properly for assembly in spite of heat and moisture, which tend to distort the plastic substrates.

SUMMARY OF THE INVENTION

Generally speaking, in accordance with the instant invention, a liquid crystal display panel having flexible plastic substrates which are not misaligned and a process for the production thereof is provided. The liquid crystal display panel includes a first flexible plastic film substrate, with an electrode pattern formed thereon. In addition, the first substrate has alignment holes or recessed kerfs. The first substrate is longer than the liquid crystal display panel will be. The liquid crystal display panel also includes a second flexible plastic film substrate of a predetermined length. A sealant, which may be supported on the periphery of the second substrate, may be provided for sealing the liquid crystal between the first and second substrates. A liquid crystal display panel is formed by the first and second substrates and sealant when a liquid crystal is contained therebetween.

A process for the production of a liquid crystal display panel, including at least two flexible plastic substrates in accordance with the present invention is provided. A transparent electrode is formed on at least one surface of the first flexible plastic substrate, which is longer than the liquid crystal display panel. A second plastic film is cut to a predetermined length. The first and second plastic films are then assembled into a liquid crystal display panel.

Accordingly, it is an object of the instant invention to provide an improved liquid crystal display panel.

Another object of the instant invention is to provide a liquid crystal display panel in which the substrates are not misaligned.

A further object of the instant invention is to provide a liquid crystal display panel having alignment holes for greater accuracy in assembly.

Yet another object of the instant invention is to provide a process for the production of a liquid crystal display panel which prevents misalignment of substrates under varied temperature and humidity conditions.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
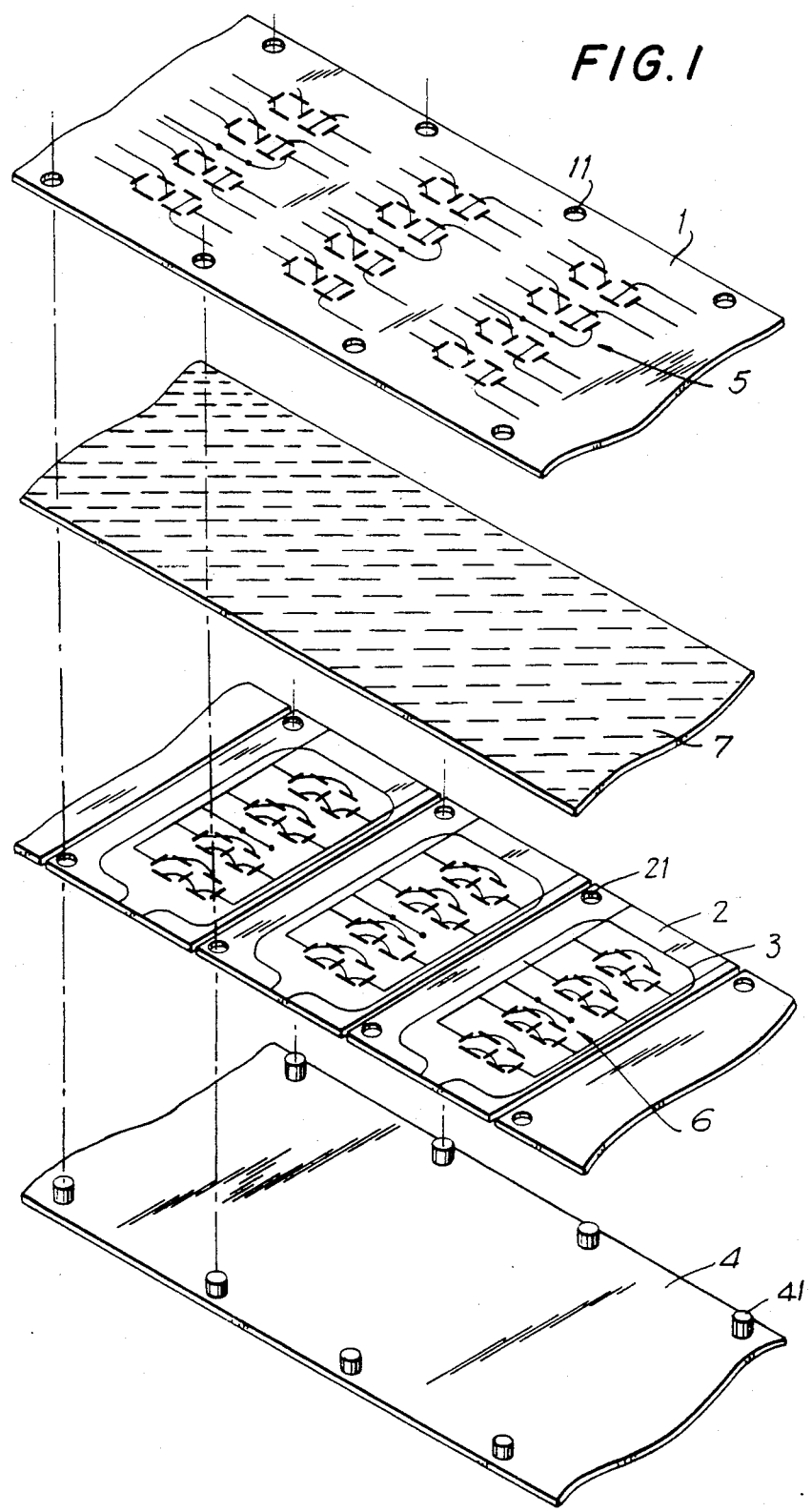
FIG. 1 is an exploded view of a liquid crystal display panel in accordance with the instant invention.

Reference is first made to FIG. 1, wherein a first embodiment of a liquid crystal display panel in accordance with the present invention is depicted. A first substrate 1 is made of flexible plastic film formed with a predetermined transparent electrode pattern 5 on one surface thereof. Substrate 1 is in the form of a continuous film which may come in a roll. A second flexible plastic substrate 2 may also come in a roll. A transparent electrode pattern 6 is formed on one surface of substrate 2. A sealing agent 3 is printed on substrate 2. Substrate 2 is then cut into segments of a predetermined length prior to assembly. Substrates 1 and 2 have aligning holes 11 and 21 respectively in their surfaces for assembly purposes. An assembly jig 4, having pegs 41 is used to assemble the liquid crystal display panels. A display panel is formed by placing substrate 2 onto assembly jig 4 with the transparent electrode pattern facing up so that aligning holes 21 fit onto pegs 41 of assembly jig 4. Then substrate 1 is placed on top of substrate 2 and assembly jig 4 with the transparent electrode pattern facing down so that aligning holes 11 fit around pegs 41. A panel is formed by the joining of the substrates by sealing agent 3. A liquid crystal 7 is then injected into the assembled panel and the panel is cut to a predetermined shape by pressing or shearing.

Figure 2:
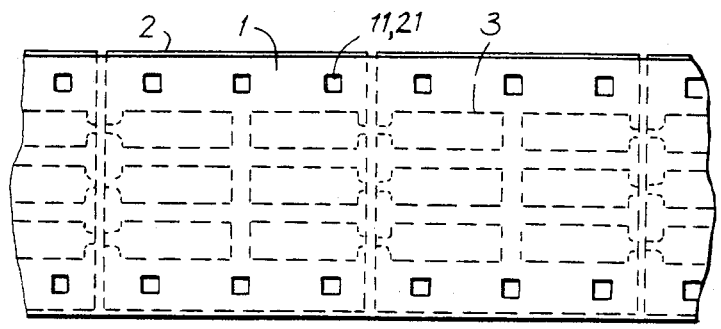
FIG. 2 is a top plan view of a second embodiment of a liquid crystal display panel in accordance with the instant invention.
Figure 3:
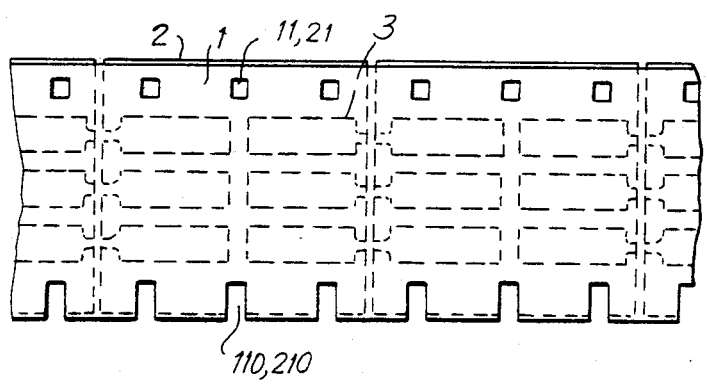
FIG. 3 is a top plan view of a third embodiment of a liquid crystal display panel in accordance with the instant invention.
Figure 4:
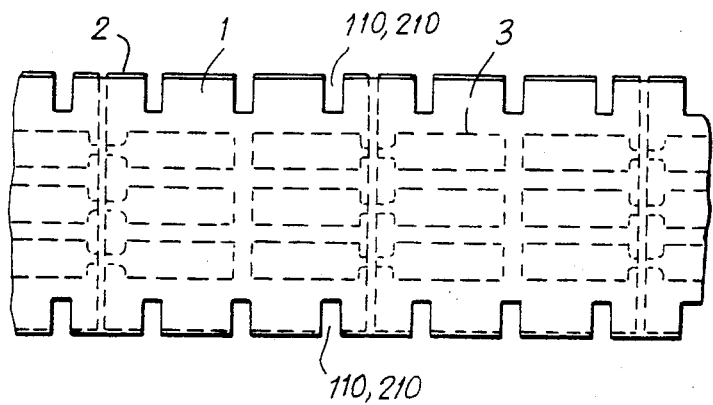
FIG. 4 is a top plan view of a fourth embodiment of a liquid crystal display panel in accordance with the instant invention.

Reference is next made to FIGS. 2, 3 and 4, wherein alternate embodiments of the liquid crystal display panel in accordance with the present invention are depicted. Although holes 11 and 21 are shown along both edges of substrates 1 and 2, holes along only one edge are sufficient. Holes 11 and 21 can be replaced by recessed kerfs formed at each edge of the substrate. It is also possible that only continuous substrate 1 has holes or recessed kerfs. In addition, the holes can be in the center portions of substrates 1 and 2, rather than at the edges. The holes and kerfs can be any shape, so long as pegs 41 are a complementary shape adapted to securely position substrates 1 and 2 for assembly.

Specifically, in FIG. 2, square holes 11 and 21 are provided in the substrates. In the embodiment of FIG. 2, each segment of substrate 2 defines six liquid crystal display panels. In FIG. 3 both holes 11 and 21 and recesses 110 and 210 are provided. In FIG. 4, only recesses 110 and 210 are provided to insure alignment of its substrates.

A process for producing liquid crystal display panels in accordance with the present invention is provided. The process is applicable to the formation of liquid crystal display panels from continuously produced substrates 1 and 2 upon which transparent electrodes have been formed by evaporation, sputtering or other method, and on which predetermined electrode patterns 5 and 6 have been formed by etching. Substrates 1 and 2 may be coated with an orientation agent, and rubbed with gauze after electrode patterns 5 and 6 have been formed.

Sealing agent 3 may be provided on either of substrates 1 and 2. Sealing agent 3 contains glass fibers or particles or the like so as to maintain a uniform cell thickness for the liquid crystal display panel. Sealing agent 3 includes materials for maintaining spacing between said first and second substrates. Sealing agent 3 would be added after rubbing of the orientation agent on substrates 1 and 2. A gap control agent, which may be glass fibers or particles may be scattered or coated on substrates 1 and 2 to further increase the uniformity of the display panel thickness.

Display panel 2 is cut so that its dimensions take into account and make up the expansion or shrinkage of the plastic materials, which deformation is caused by heat or moisture conditions.

Substrates 1 and 2 can be formed from synthetic resins including polyester, cellulose, polyethersulfone system, polysulfone, acrylic resin, phenoxy system resin, a film of any such resin, or a plurality of layers of any such resin or film. Substrates 1 and 2 may be polarized or made reflective by, for example, evaporation, sputtering, or bonding. Substrates 1 and 2 may have a thickness of about 0.025 to about 1.5 mm. A thin liquid crystal display panel may be formed from a substrate thickness of about 0.025 to about 1 mm. A substrate having a thickness of about 0.05 to about 0.2 mm is readily manufactured.

The invention will now be described in further detail with reference to several examples thereof.

EXAMPLE 1

A plurality of 2 mm square holes were formed on bases 1 and 2 by pressing along both edges of polyethersulfone film 100 μm thick and 200 mm wide. A transparent indium oxide conductive film 300 Å thick was formed by ion sputtering. Predetermined electrode patterns 5 and 6 were formed on bases 1 and 2 by photolithography. An orientation agent, consisting essentially of polyimide was applied in a layer 20–30 μm thick to bases 1 and 2. The orientation agents were then rubbed with gauze to create an orientation effect. Sealing agent 3 was printed on substrate 1, and a gap control agent composed of glass fiber fragments was scattered on substrate 1. Substrate 2 was cut into short 30 cm long sections. The cut sections of substrate 2 were laid over substrate 1 and sealing agent 3 was cured at a high temperature. The sealing agent used was silicone system adhesive. Combined substrates 1 and 2 were pressed into a predetermined shape, and liquid crystal 7 was introduced therebetween by vacuum injection. The injection inlet was then closed by a silicone system adhesive.

The liquid crystal display panel could then be accurately assembled with only a dimensional deviation of about 0.2–0.25 mm between substrates 1 and 2 in each 30 cm long assembled unit. This dimensional deviation is negligible where a plurality of liquid crystal display patterns are formed from each 30 cm unit. Even larger liquid crystal display panel patterns can be formed with only negligible dimensional allowances and without causing any assembly problems.

EXAMPLE 2

The procedures of Example 1 were repeated, except that a polyester film 40 cm wide was used for substrates 1 and 2. Substrate 2 was cut into 50 cm length sections. A liquid crystal display panel could be accurately assembly with only a dimensional deviation of about 0.08–0.09 mm within each 50 cm long assembled unit. This is due to the characteristics of the polyester film which has a thermal expansion coefficient of about $2.5\times10^{-5}$/deg. and a wet expansion coefficient of about $0.2$–$0.3\times10^{-5}$/%RH.

EXAMPLE 3

The procedures of Example 1 were repeated, except that a phenoxy resin film was used. Substrate 2 was cut into 70 cm long sections. The film had a width of about 60 cm and a thickness of 0.03 mm. The film had the same thermal and wet expansion coefficients as in Example 2. A liquid crystal panel could be accurately assembled with only a dimensional deviation of about 0.10–0.13 mm within each 70 cm long assembly unit. This deviation did not present any assembly problems.

EXAMPLE 4

The procedures of Example 1 were repeated, except that a polyester film 50 cm wide was used. Substrate 2 was cut into 40 cm long sections. A liquid crystal display panel could be accurately assembled with only a transverse dimensional deviation of about 0.08–0.09 mm amnd a smaller longitudinal deviation between substrates 1 and 2 within each 40 cm long unit.

COMPARATIVE EXAMPLE 1

A pair of substrates of polyethersulfone film were assembled in their original uncut form. Substrates 1 and 2 were formed with holes at a temperature of 20° C. and a relative humidity of 40% as well as at a temperature of 25° C. and a relative humidity of 60%. They were then assembled under the same conditions. A dimensional deviation of about 6 to 9 mm was found for each 10 m, since polyethersulfone film has a thermal expansion coefficient of about $5\times10^{-5}$/deg. and a wet expansion coefficient of about 2 to $3\times10^{-5}$/%RH.

COMPARATIVE EXAMPLE 2

The procedures of Comparative Example 1 were repeated. The holes were formed with an accuracy of ±0.01%.

COMPARATIVE EXAMPLE 3

The procedures of Comparative Example 1 were repeated, except that a polyester film was used for substrates 1 and 2. A dimensional deviation of about 1–2 mm was found for each 10 m since the polyester film has a thermal expansion coefficient of about $2.5\times10^{-5}$/deg. and a wet expansion coefficient of about $0.2$–$0.3\times10^{-5}$/%RH.

As is obvious from the foregoing, this invention enables the more accurate assembly of a liquid crystal display panel without any displacement, wrinkle or sagging when substrates 1 and 2 are combined, even if there is some additional positional deviation between holes 11 and 21 in substrates 1 and 2. The use of a flexible plastic film as a substrate permits continuous production of liquid crystal display panels which has been impossible with conventional glass substrates. It is also possible, by cutting substrate 2 into short sections, to manufacture liquid crystal display panels without any misalignment between substrates 1 and 2. The above described process also improves the efficiency and yield in the continuous production of a plastic liquid crystal display panel.

Because substrates 1 and 2 are formed from a flexible material, the panel can be bent to provide a wider range of applications. In addition, the substrates can be made very thin, thereby providing a small and light liquid crystal display panel with superior optical characteristics.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display panel assembly comprising:
   a first elongated plastic film substrate;
   at least two second plastic film substrates each of a predetermined length, said second substrates overlying said first substrate;
   an electrode pattern disposed on the facing surfaces of each of said first and second substrates; and
   sealing means for sealing each said second substrate to said first substrate.

2. A liquid crystal display panel assembly, as claimed in claim 1, including liquid crystal material intermediate said first and second substrates.

3. A liquid crystal display panel assembly, as claimed in claim 1, wherein said electrode patterns and sealing means define a plurality of liquid crystal display panels in the region defined by each second substrate.

4. A liquid crystal display panel assembly, as claimed in claim 1, wherein at least one of said first and second substrates are formed with alignment apertures or peripheral recesses.

5. A liquid crystal display panel assembly, as claimed in claim 4, wherein both the first and second substrates have alignment apertures or peripheral recesses, the apertures or peripheral recesses in each second substrate being aligned with corresponding apertures or peripheral recesses in said first substrate.

6. A liquid crystal display panel assembly, as claimed in claim 1, wherein the sealing means includes means for maintaining spacing between said first and second substrates.

7. A liquid crystal display panel assembly, as claimed in claim 1, wherein said substrates are formed from a synthetic resin selected from the group consisting of polyester, cellulose, polyethersulfone system, polysulfone, acrylic resin and phenoxy system resin.

8. A liquid crystal display panel assembly, as claimed in claim 1, wherein said second substrates are each of a length selected in consideration of the positional deviation which may occur between the first and second substrates when joined together.

9. A liquid crystal display panel assembly, as claimed in claim 1, wherein said second substrates are each of a length selected in consideration of at least one of the thermal and wet expansion coefficients of said substrates.

10. A liquid crystal display panel assembly, as claimed in claim 1, wherein said substrates are of a thickness of about 0.025 to about 1.5 mm.

11. A liquid crystal display panel assembly, as claimed in claim 1, wherein said first and second substrates are flexible.

12. A liquid crystal display panel assembly comprising:
    a first flexible plastic substrate;
    at least two second flexible plastic film substrates of a predetermined length, said second substrates overlying said first substrate, at least one of said first and second substrates being formed with alignment apertures or peripheral recesses;
    an electrode pattern disposed on the facing surfaces of the first and second substrates; and
    sealing means for sealing said first substrate to said second substrate;
    whereby at least one liquid crystal panel may be formed from the joined first and second substrates.

13. A liquid crystal display panel assembly, as claimed in claim 12, wherein both said first and second substrates have alignments apertures or peripheral recesses positioned to align the respective electrode patterns on said substrates being aligned with each other.

14. A liquid crystal display panel assembly, as claimed in claim 13, wherein said electrode patterns and sealing means define a plurality of liquid crystal display panels in the region defined by each second substrate.

15. A liquid display panel assembly, as claimed in claim 12, including liquid crystal material intermediate said first and second substrates.

16. A liquid crystal display panel assembly, as claimed in claim 12, wherein said substrates are formed from a synthetic resin selected from the group consisting of polyester, cellulose, polyethersulfone system, polysulfone, acrylic resin and phenoxy system resin.

17. A liquid crystal display panel assembly, as claimed in claim 12, wherein said substrates are of a thickness of about 0.025 to about 1.5 mm.

18. A liquid crystal display panel assembly, as claimed in claim 12, wherein said first and second substrates are flexible.

19. A process for the production of a liquid crystal display panel comprising at least two plastic substrates comprising:
    forming an electrode pattern on at least one surface of a first elongated plastic film to define a first substrate;
    forming an electrode pattern on a second plastic film;
    cutting said second plastic film to at least two sections each of a predetermined length to define at least two second substrates;
    joining each of said second substrates to said first substrate with the respective electrode patterns in facing relation; and
    inserting a liquid crystal material between each said second substrates and said first substrate, to form at least two liquid crystal display panels.

20. A process for the production of a liquid crystal display panel, as claimed in claim 19, wherein the second plastic film substrates are each cut to a predetermined length which depends on at least one of the thermal and wet expansion coefficients of the first and second plastic film substrates.

21. A liquid crystal display panel produced by the process of claim 20.

22. A process for the production of a liquid crystal display panel, as claimed in claim 19, wherein the second plastic film substrates are each cut to a predetermined length which depends on a positional deviation which may occur between said first and second electrodes when joined together.

23. A liquid crystal display panel produced by the process of claim 22.

24. A process for the production of a liquid crystal display panel, as claimed in claim 19, wherein the electrode patterns are formed by one of sputtering and evaporation and are etched into a predetermined pattern.

25. A process for the production of a liquid crystal display panel, as claimed in claim 19, including forming alignment apertures or peripheral recesses in one of said first and second substrates.

26. A process for the production of a liquid crystal display panel, as claimed in claim 25, including forming alignment apertures or peripheral recesses in both of said first and second substrates.

27. A process for the production of a liquid crystal display panel, as claimed in claim 26, wherein said substrates are assembled on an assembly jig having a plurality of pins projecting therefrom for receiving said alignment apertures or pheripheral recesses to position said substrates so that the respective electrode patterns are aligned.

28. A liquid crystal display panel produced by the process of claim 27.

29. A process for the production of a liquid crystal display panel, as claimed in claim 19, wherein said electrode patterns and means joining said substrates are adapted to define at least two liquid crystal display panels between each second substrates and said first substrate.

30. A liquid crystal display panel produced by the process of claim 29.

31. A process for the production of a liquid crystal display panel, as claimed in claim 19, wherein said substrates are of a thickness of about 0.025 to about 1.5 mm.

32. A liquid crystal display panel produced by the process of claim 31.

33. A process for the production of a liquid crystal display panel as claimed in claim 19, wherein said films are formed to be flexible.

34. A liquid crystal display panel produced by the process of claim 33.

35. A process for the production of a liquid crystal display panel, as claimed in claim 19, wherein said substrates are formed from a synthetic resin selected from the group consisting of polyester, cellulose, polyethersulfone system, polysulfone, acrylic resin and phenoxy system resin.

36. A liquid crystal display panel produced by the process of claim 19.

37. A process for the production of a liquid crystal display panel as claimed in claim 19, wherein said second substrates are joined to said first substrate by a sealing means, said second substrates having a length greater than said sealing means in order to compensate for a positional deviation between said first and second electrodes when said substrates are joined together.

* * * * *